Aug. 22, 1933.   H. FRIEDMAN ET AL   1,923,817
ATMOSPHERIC PRESSURE OPERATED LOCKING MECHANISM
Filed Dec. 1, 1931
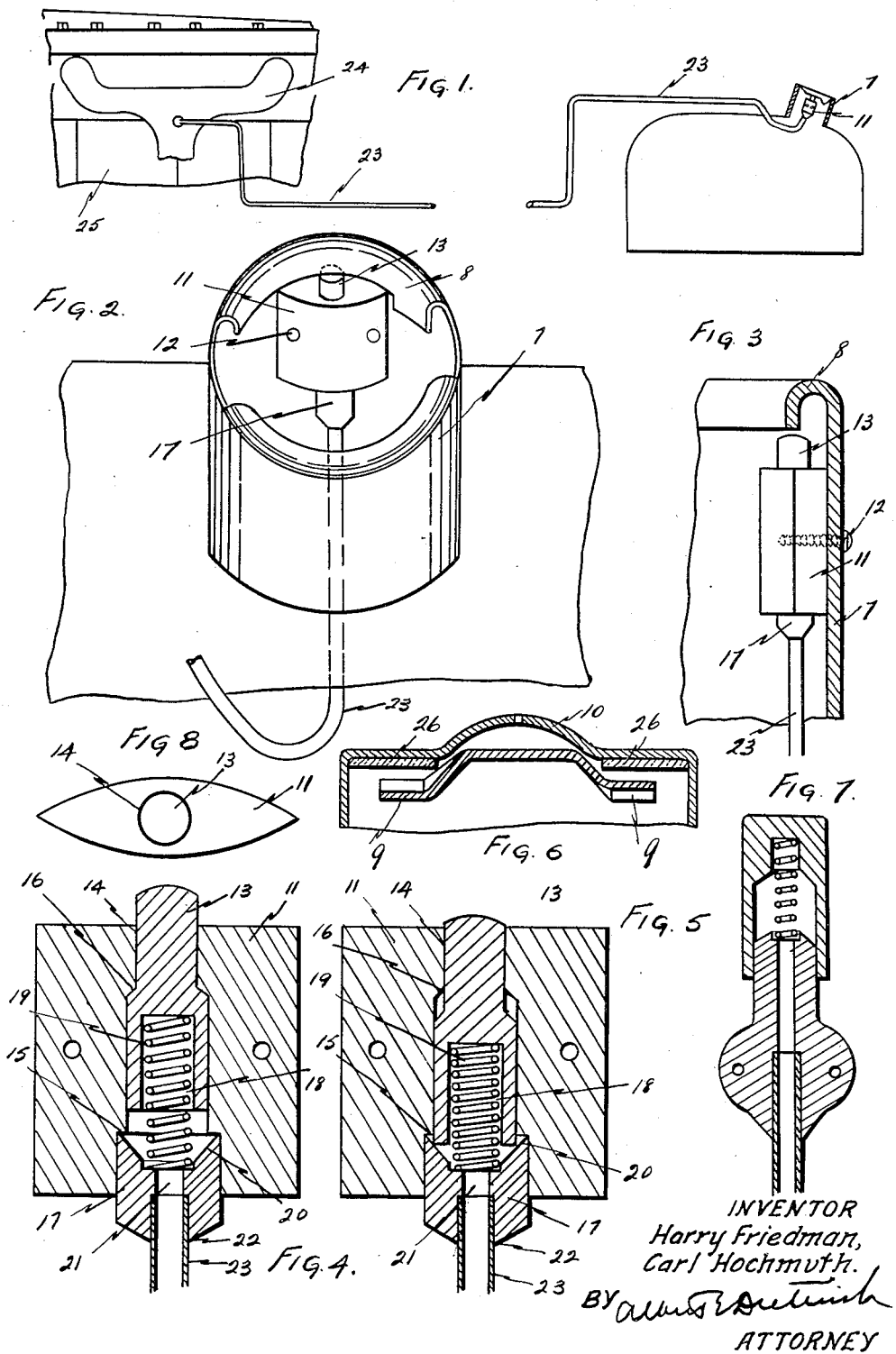
INVENTOR
Harry Friedman,
Carl Hochmuth.
BY
ATTORNEY Patented Aug. 22, 1933

1,923,817

UNITED STATES PATENT OFFICE 1,923,817

ATMOSPHERIC PRESSURE OPERATED LOCKING MECHANISM

Harry Friedman and Carl Hochmuth, Vancouver, British Columbia, Canada

Application December 1, 1931. Serial No. 578,410

3 Claims. (Cl. 70—90)

This invention relates to locking mechanisms and more particularly to locks operable by atmospheric pressure induced to act through suction of an internal combustion engine.

The invention is particularly designed to operate in and about the chassis of an automative vehicle, although it is conceivable of operation in other fields and spheres of activity.

The invention may be applied as a radiator cap lock, a hood lock, spare tire lock and more particularly as a cap lock to the gasoline tank of a car, and when so applied prevents, pilfering stealing and siphoning of the gasoline by unauthorized parties.

An object of the invention has been to provide simple and unobtrusive means to prevent the removal and stealing of gasoline from the tanks of parked cars by petty thieves as by the use of our invention the cap to the gasoline tank cannot be removed while the engine is stopped.

A further object of the invention has been to provide a simple mechanism not liable to disarrangement or to get out of order and one susceptible of application to the great majority of cars, either new or old.

A still further object of the invention has been to provide locking mechanisms adaptable for use as a hood lock, spare tire lock and a radiator cap lock as by means of our invention it is impossible to open the hood of an engine or remove the radiator cap or spare tire when the engine is stopped and the car parked.

Our invention, when applied to a gasoline tank, consists essentially of a spring-plunger mounted within a suitable block that may be installed either within the neck or upon the outside of the spout of the gasoline tank engaging with the ears of the cap to prevent the cap being turned before removing the same, as the great majority of cars to-day are fitted with some style of bayonet lock that requires a partial turn of the cap to either remove or secure the cap on the tank opening.

When so mounted upon the car and the engine stopped the plunger is in the extended position and projects in front of one of the ears on the inside of the cap and prevents the cap being turned to remove same and thus it is impossible to remove the cap under these conditions.

The block in which the spring plunger is mounted has a port engaging with the base or cylinder in which the plunger operates, and this port is connected by metallic tubing with the intake manifold of the engine and immediately upon starting the engine the plunger is thrust within its cylinder or block by reason of the pressure differential between the atmosphere and the interior of the intake manifold and the caps or hoods to which the locks are applied are free, but immediately the engine stops the plungers are again extended and engage with whatever they are arranged to engage.

It is a well known fact that the stealing of automobile accessories, such as spare tires, radiator ornaments, gasoline, etc., takes place in the absence of the owner of the car and generally when the car is parked, and these thefts can now be all obviated by the use of our invention applied to gasoline tanks, spare tires and radiator caps and ornaments, as it is a simple matter to so arrange and conceal the metallic tubing connected with the intake manifold that there is nothing conspicuous about the installation.

Our invention does not in any way inconvenience the servicing of the car at gas stations when taking on gasoline as all that is necessary is to keep the engine running until the attendant has removed the gasoline cap when the engine can be stopped while taking gas, after which the cap can be applied in the usual way.

Our invention can be arranged to operate with the ordinary screw caps still found on some cars and also on radiators and can be arranged to operate either from the inside or outside of the necks.

As a spare tire lock our invention is susceptible to a great variety of forms but we do not claim invention in the shape or design such lock may assume unless the same operates with an atmospheric air pressure actuated plunger which we claim as our invention and all such devices fall within the scope of our appended claims.

Our invention will be more readily understood by reference to the drawing accompanying and forming part of this application and in which:

Figure 1 is a diagrammatic view of the engine block and intake manifold connnected by metallic tubing to the locking mechanism positioned within the neck of a filling spout of a gasoline tank carried on the rear of a chassis of an automotive vehicle.

Figure 2 is a perspective view of the filling spout of a gasoline tank with cap removed showing locking device positioned inside thereof and shows spring plunger extended and contacting with the turned over arcuate track engaged by the ears of the cap to comprise a lock for same.

Figure 3 is a fragmental sectional view of filling spout showing how the lock is secured thereto by screws through the side thereof.

Figure 4 is a sectional view of the lock and shows plunger extended under the action of the spring therein and also duct connecting with the intake manifold.

Figure 5 is another sectional view of the lock showing the plunger withdrawn within its cylinder under the influence of the pressure differential between the atmosphere and the interior of the intake manifold and shows the seating of the base of the plunger upon its seat where it is retained by the said pressure differential, thereby preventing splash of gasoline or air entering the duct leading to the intake manifold.

Figure 6 is a sectional view of standard form of cap used for closing the filling neck of gasoline tanks and shows ears that engage with the arcuate track formed on the inside of filling neck as shown in Figure 2. (Note. Ears are shown inclined to provide a more efficient stop against plunger when cap is secured upon filling cap and in locked position.)

Figure 7 shows an alternate construction of lock to that shown in Figures 4 and 5, this style being adaptable for use as a hood lock or spare tire lock.

Figure 8 is a plan view of Figure 4.

In the drawing like numerals indicate like parts and 7 indicates the usual filling neck of an automobile gasoline tank, while 8 is the turned over portion at the top of the neck to comprise a race or slide of the nature of an arcuate track under which the lugs 9 of the cover 10 engage to secure the cover on the filling neck 7.

Positioned within the neck 7 is the atmospheric pressure operated lock 11 secured thereto by the screws 12. Secured within the body of the lock is the plunger 13 projecting beyond the upper surface of the body and nearly contacting the under edge of the turned over portion 8 of the neck 7, see Figure 3, which is a fragmental view of a portion of the neck 7 to show installation of lock therein.

The sides of the lock 11 are of a curvature adapted to fit the inner contour of the filling neck and this construction offers but small obstruction when filling the tank as the lock lies snugly to one side and out of the way of the filling spout.

The main body portion of the lock 11 has a central bore 14 therethrough having two shouldered enlargements 15 and 16, the upper shoulder 15 comprising a stop for the plunger 13 while the lower shoulder comprises a stop for the closure member 17 secured within the bottom of the bore 14, as shown in Figures 4 and 5.

The lower portion of the plunger 13 is drilled out to provide the recess 18 in which the spring 19 is housed, being supported and carried by the closure member 17. The inner face of the closure member is countersunk as at 20 and provides a seat for the lower end of the plunger 13 when the plunger is wholly within the body portion of the lock, as shown in Figure 5.

A port or aperture 21 is provided through the centre of the closure member 17 having a shoulder at 22 to provide a stop for the tubing 23 which is secured within the lower end of the closure member 17. The tubing 23 is arranged in any convenient manner to be brought out through the top or sides of the gasoline tank and connected with the intake manifold 24 of a gasoline motor 25, as shown in Figure 1.

A washer 26 is provided within the cover 10 to form a seal when the cover is in place upon the neck 7 and prevents the escape of gasoline through splashing when the car is in motion.

The lugs 9 of the cover 10 are inclined or bevelled as shown in Figure 6, for the purpose of providing a more efficient stop against the plunger 13 and also prevents the lugs jamming the plunger when twisting or turning the cover to secure it upon the neck 7 as the inclined lugs have a natural tendency to depress the plunger 13 within its housing as the cover is turned to lock it on its neck, and immediately the lugs 9 have passed over the plunger 13 the plunger is projected out of its housing under the action of the spring 19 and in front of the lugs 9 and prevents the cover being turned to remove same from the neck 7.

When using the invention on a car and applied to a gasoline tank it operates as follows:

Assuming the engine to be running, the pressure is reduced in the intake manifold of the engine and the tube or duct 23 being connected thereto and to the base of the lock 11, the pressure differential is caused to act on the plunger 13 and thrust the plunger within its housing and seat same on the countersunk seat 20 of the closure member 17, and while the plunger 13 is so seated the cover 10 of the gasoline tank is free to be removed as desired; but as soon as the engine is stopped the plunger 13 is projected from its housing by reason of the spring 19 and in front of one of the lugs 9 of the cover 10 and prevents the cover being turned to free it for removal.

When it is desired to take on gasoline it is necessary to keep the engine running until the attendant has removed the cover 10 from the tank, after which the engine can be stopped, but the cover 10 cannot be removed if it has been properly applied after the engine is stopped, because the plunger 13 is then in its extended position and prevents the turning of the cover which is necessary to remove same.

When the plunger 13 is seated on the countersunk seat 20 it forms a seal at this point and prevents any splash gasoline or air that may leak down the bore from entering at this point to effect the running of the engine through admitting extra air or gasoline to the intake manifold.

Having now fully described our invention and the manner of its use, what we claim and desire to be protected in by Letters Patent, is:

1. A locking device for the filling neck and cover of a gasoline tank which is adapted to be operated by the difference in pressure between the atmosphere and the intake manifold of an automobile engine, said device comprising a body member having a cylindrical bore, a spring and an atmospheric-pressure actuated plunger fitting said bore and projecting beyond one end thereof, a closure member fitting the opposite end of said bore and having a port therethrough and having a seat for one end of said plunger when the latter is retracted within the bore.

2. In an atmospheric-pressure actuated device, a body having a passage, a locking bolt telescopically associated with said body, a spring between said body and said bolt which tends to separate the bolt and the body, and means for preventing a passage of air between said body and said bolt into said passage when a negative pressure is established in said passage.

3. In an atmospheric-pressure actuated device, a body having a passage, a locking bolt telescopically associated with said body, a spring between said body and said bolt which tends to separate the bolt and the body, and means for preventing a passage of air between said body and said bolt into said passage when a negative pressure is established in said passage, said means comprising a seat on said body with which said bolt may engage as a valve.

HARRY FRIEDMAN.
CARL HOCHMUTH.